US007740298B1

(12) United States Patent
Larson et al.

(10) Patent No.: US 7,740,298 B1
(45) Date of Patent: Jun. 22, 2010

(54) HUMAN TRANSPORTING SYSTEM

(76) Inventors: Donald O. Larson, Box 223, Audubon, MN (US) 56511; Kasey P. Larson, 304 Homestead, Detroit Lakes, MN (US) 56501

(*) Notice: Subject to any disclaimer, the term of this patent is extended or adjusted under 35 U.S.C. 154(b) by 63 days.

(21) Appl. No.: 12/326,657

(22) Filed: Dec. 2, 2008

(51) Int. Cl.
*A45F 5/00* (2006.01)
*A22C 21/00* (2006.01)

(52) U.S. Cl. ...................................... 294/154; 294/157

(58) Field of Classification Search ................. 294/150, 294/154, 157, 81.5, 81.55; 224/921; 452/187–190
See application file for complete search history.

(56) References Cited

U.S. PATENT DOCUMENTS 123,525 A * 2/1872 Topham ...................... 294/154
2,407,172 A * 9/1946 McMillan ................... 294/154
2,499,511 A 3/1950 Koger
3,188,130 A 6/1965 Pletrowicz
3,343,862 A * 9/1967 Holmes ................... 294/81.55
4,243,164 A 1/1981 Burlison et al.
4,596,530 A 6/1986 McGlinn
4,763,942 A * 8/1988 Lyon ......................... 294/81.5
D312,164 S 11/1990 Pierotti
5,901,999 A 5/1999 Brock
5,951,080 A 9/1999 Wessner
6,089,636 A 7/2000 Harris
6,379,205 B1 4/2002 Wallasch
7,226,351 B1 * 6/2007 Sliger et al. ................. 452/188

* cited by examiner

*Primary Examiner*—Paul T Chin
(74) *Attorney, Agent, or Firm*—Neustel Law Offices

(57) ABSTRACT

A human transporting system for efficiently removing an injured person out of water. The human transporting system generally includes a handle, a pair of straps attached to the handle, a pair of sliding loops attached to the straps forming looped portions for receiving the wrists of an injured human, and a pair of biasing members attached between the handle and the sliding loops. The looped portions receive the wrists of the injured human and the user pulls the injured human from the water by pulling upon the handle which tightens the looped portions upon the wrists. Once the injured human is pulled out of the water, the handle is lowered thereby allowing the biasing members to loosen the looped portions about the wrists.

20 Claims, 6 Drawing Sheets

HUMAN TRANSPORTING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to human transport devices and more specifically it relates to a human transporting system for efficiently removing an injured person out of water.

2. Description of the Related Art

Any discussion of the related art throughout the specification should in no way be considered as an admission that such related art is widely known or forms part of common general knowledge in the field.

When a human is injured (e.g. unconscious) in water, they are difficult to remove from the water because of various factors including slippery wet skin, increased weight of water soaked clothing and maneuvering in water. It typically requires at least two individuals to remove an injured person from water which can be detrimental if more than one human is injured in the water. If only one individual is available to rescue the injured human, it can take a significant amount of time to remove the injured human.

Because of the inherent problems with the related art, there is a need for a new and improved human transporting system for efficiently removing an injured person out of water.

BRIEF SUMMARY OF THE INVENTION

The general purpose of the present invention is to provide a human transporting system that has many of the advantages of the human transport devices mentioned heretofore. The invention generally relates to a human transport devices which includes a handle, a pair of straps attached to the handle, a pair of sliding loops attached to the straps forming looped portions for receiving the wrists of an injured human, and a pair of biasing members attached between the handle and the sliding loops. The looped portions receive the wrists of the injured human and the user pulls the injured human from the water by pulling upon the handle which tightens the looped portions upon the wrists. Once the injured human is pulled out of the water, the handle is lowered thereby allowing the biasing members to loosen the looped portions about the wrists.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a human transporting system for efficiently removing an injured person out of water or other environments.

A further object is to provide a human transporting system that is easily attached to and automatically released from the arms of an injured human.

Another object is to provide a human transporting system that may be utilized on humans of various sizes and weights.

An additional object is to provide a human transporting system that allows a single person to remove an injured human out of water.

A further object is to provide a human transporting system that quickly and safely removes an injured human out of water without slippage.

Another object is to provide a human transporting system that may be utilized by various individuals such as but not limited to police, rescue personnel, boaters, property owners and military.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
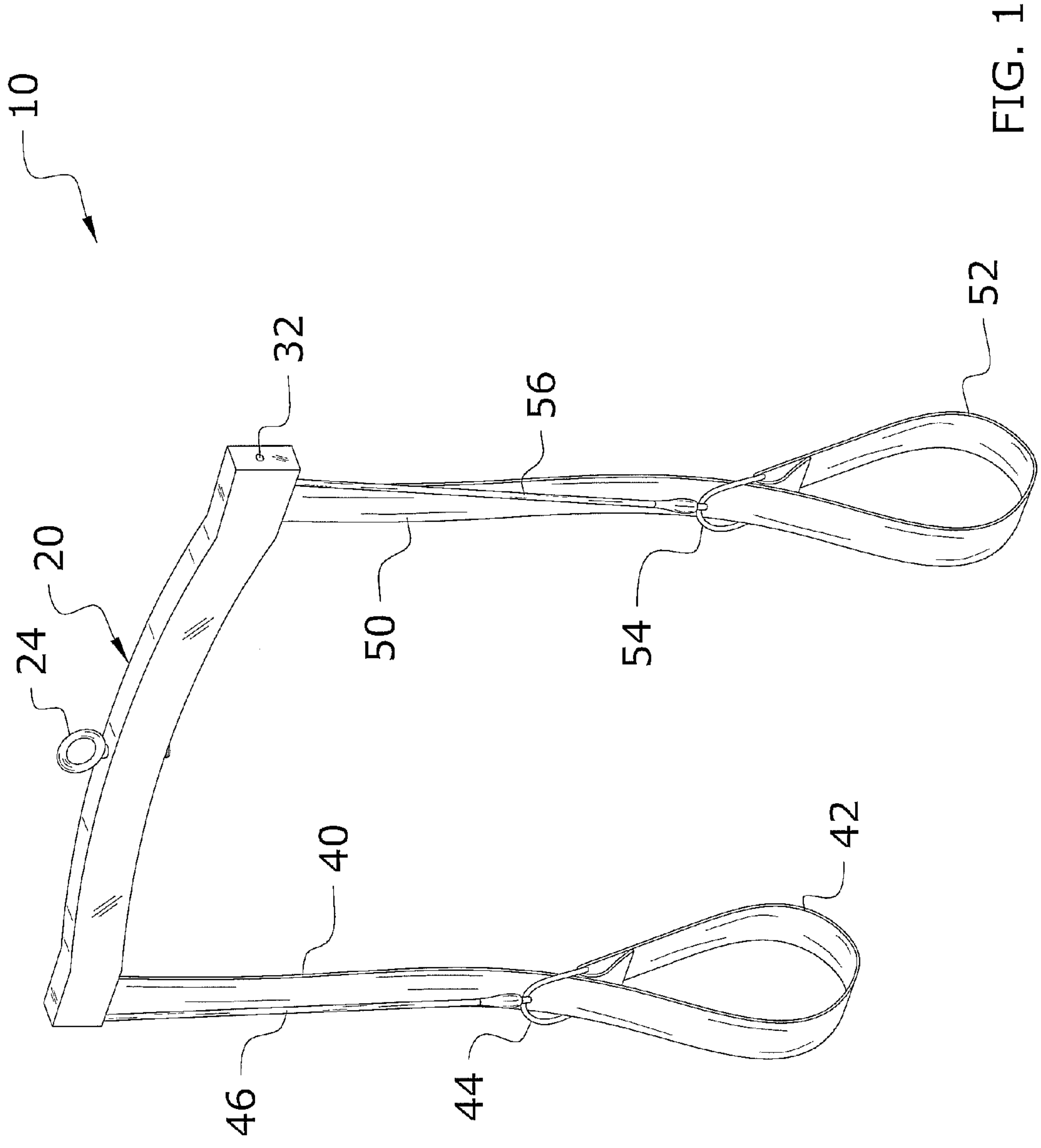
FIG. 1 is an upper perspective view of the present invention.

Turning now descriptively to the drawings, in which similar reference characters denote similar elements throughout the several views, FIGS. 1 through 6 illustrate a human transporting system 10, which comprises a handle 20, a pair of straps attached to the handle 20, a pair of sliding loops attached to the straps forming looped portions for receiving the wrists 12 of an injured human, and a pair of biasing members attached between the handle 20 and the sliding loops. The looped portions receive the wrists 12 of the injured human and the user pulls the injured human from the water by pulling upon the handle 20 which tightens the looped portions upon the wrists 12. Once the injured human is pulled out of the water, the handle 20 is lowered thereby allowing the biasing members to loosen the looped portions about the wrists 12.

B. Handle

Figure 2:
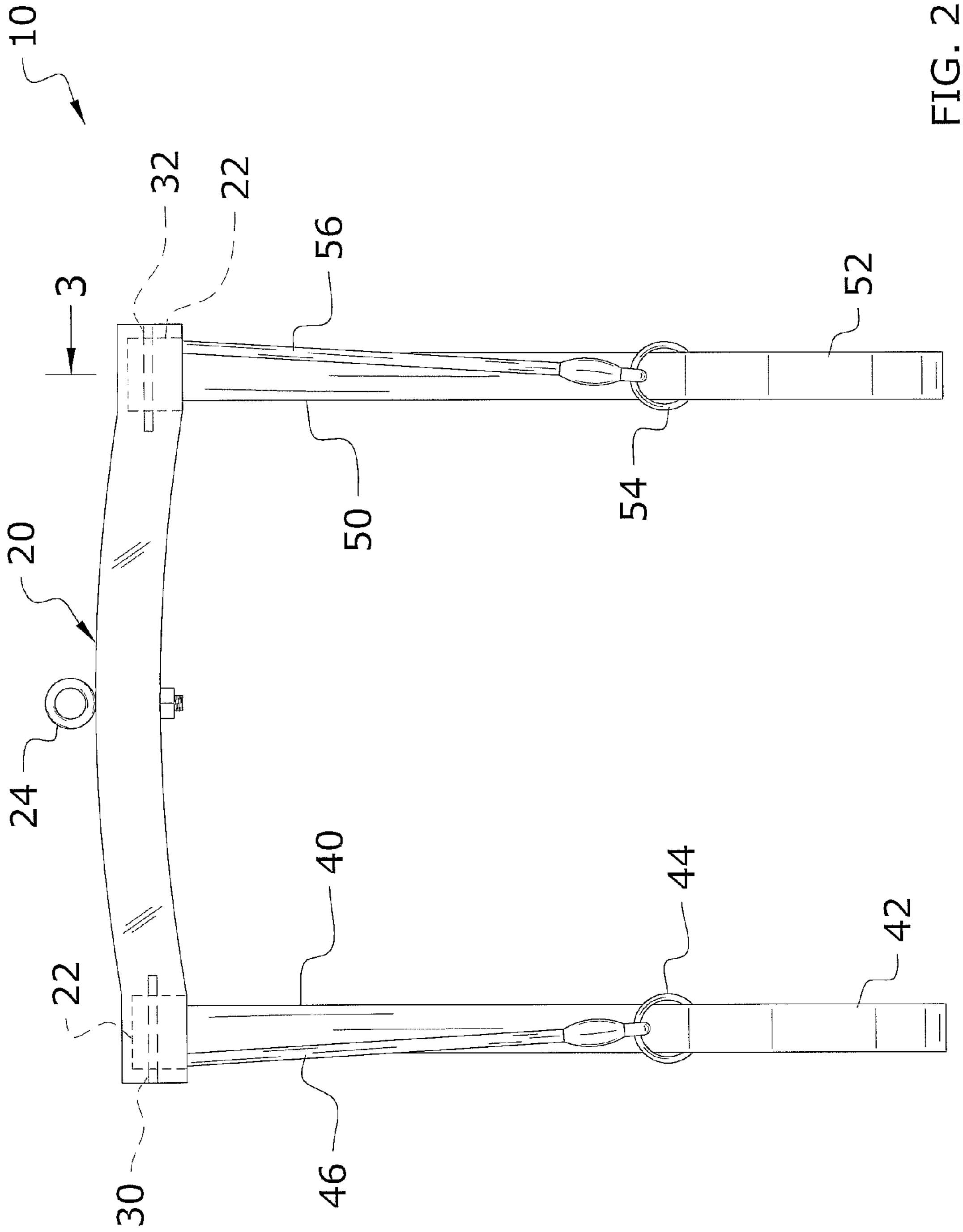
FIG. 2 is a front view of the present invention.

FIGS. 1 and 2 best illustrate an exemplary handle 20 comprised of an elongated structure having a first end and a second end. The handle 20 includes an outer surface and an inner surface opposite of the outer surface, wherein the inner surface faces the straps and is comprised of a curved structure to provide an ergonomic surface for the user to grasp with one or more hands. The handle 20 may be comprised of any rigid material such as but not limited to wood, plastic, composite and metal.

Figure 3:
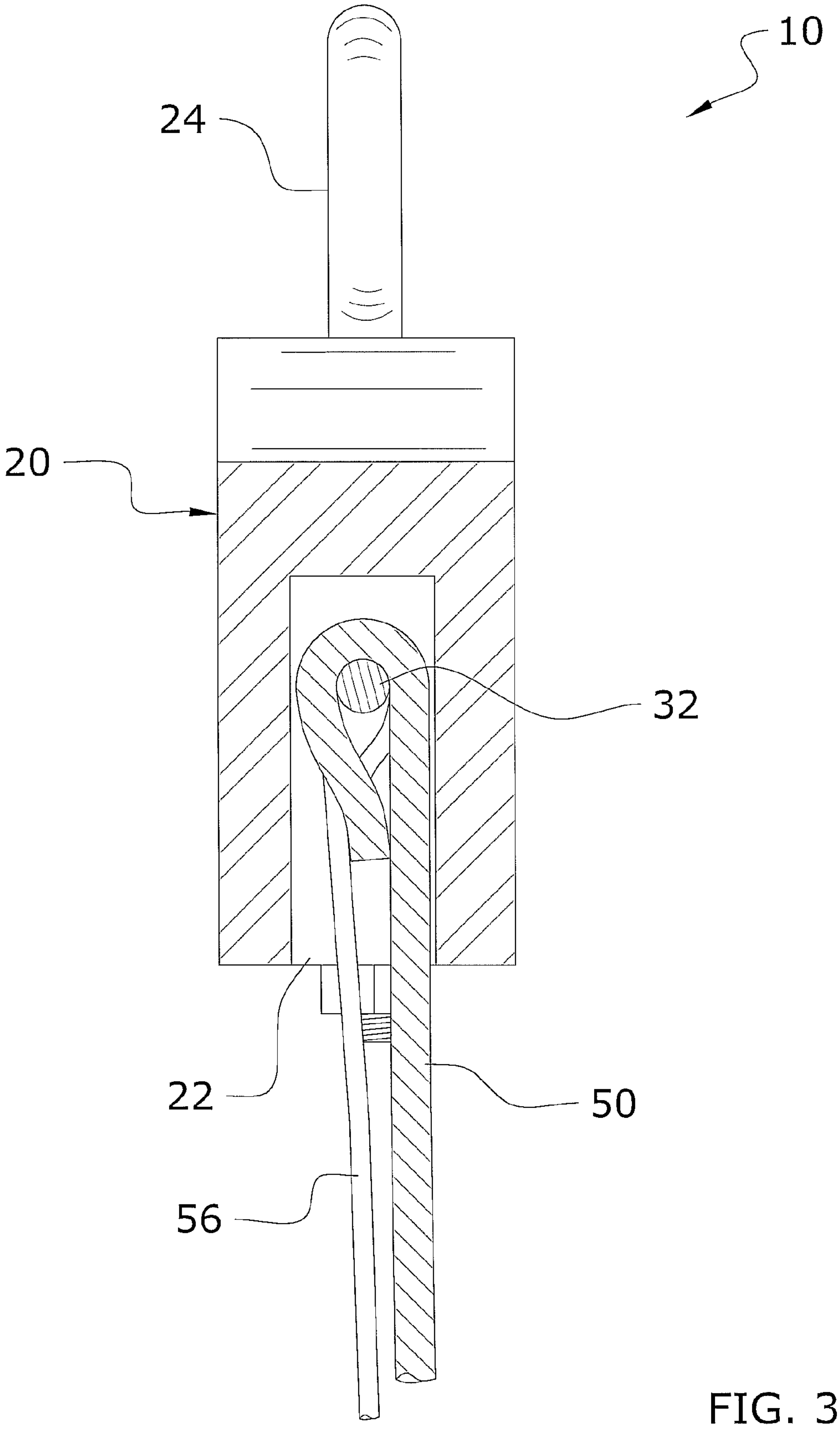
FIG. 3 is a cross sectional view taken along line 3 of FIG. 2 illustrating the connection of the strap and biasing member to the support member.

At least one cutout 22 extends into the inner surface of the handle 20 as illustrated in FIG. 3 of the drawings. As shown in FIG. 2 of the drawings, a pair of opposing cutouts 22 extend into the handle 20 receiving the corresponding straps 40, 50. At least one support member 30, 32 (e.g. pin, fastener) is attached within the cutout 22, wherein the straps 40, 50 and the biasing members 46, 56 are attached to the at least one support member 30, 32. It is preferable to have a first support member 30 in the first cutout 22 and a second support member 32 in the second cutout 22 as illustrated in FIG. 2 of the drawings.

As shown in FIGS. 1 through 4*b* of the drawings, an eye bolt 24 or similar structure is attached centrally to the handle 20. The eye bolt 24 has an eyelet that receives a rope, chain or other elongated item that can be used for significant distances such as when an individual is being rescued from ice.

C. Straps

As illustrated in FIGS. 1 and 2 of the drawings, a first strap 40 is attached to the handle 20 adjacent the first end of the handle 20. A second strap 50 is attached to the handle 20 adjacent the opposing second end of the handle 20. The weight of the injured human is preferably substantially evenly distributed to both ends of the handle 20 during transporting of the injured human to assist in the balancing of the same. The first strap 40 and the second strap 50 are each preferably comprised of a broad flat strap material as illustrated in FIG. 1 of the drawings. The straps 40, 50 are preferably substantially equal in length to assist in the balancing of the handle 20.

D. Sliding Loops

A first sliding loop 44 is attached to a distal end of the first strap 40 as shown in FIG. 1 of the drawings. The first sliding loop 44 slidably receives a portion of the first strap 40 within an opening within the first sliding loop 44 forming a first looped portion 42 opposite of the handle 20 for receiving a first wrist 12 of an injured human.

A second sliding loop 54 is attached to a distal end of the second strap 50. The second sliding loop 54 slidably receives a portion of the second strap 50 through an opening within the second sliding loop 54 forming a second looped portion 52 opposite of the handle 20 for receiving a second wrist 12 of an injured human. The first sliding loop 44 and the second sliding loop 54 are each preferably comprised of a rigid circular ring that easily slides along the corresponding straps 40, 50.

E. Biasing Members

A first biasing member 46 is attached between the handle 20 and the first sliding loop 44 as shown in FIGS. 1 and 2 of the drawings. The first biasing member 46 applies a force upon the first sliding loop 44 drawing the first sliding loop 44 toward the handle 20 thereby loosening the first looped portion 42 when the injured human is not being transported.

A second biasing member 56 is attached between the handle 20 and the second sliding loop 54 adjacent the second end of the handle 20 opposite of the first biasing member 46. It is preferable that the biasing members 46, 56 are substantially aligned with their respective straps 40, 50 as illustrated in FIG. 2 of the drawings. The second biasing member 56 applies a force upon the second sliding loop 54 drawing the second sliding loop 54 toward the handle 20 thereby loosening the second looped portion 52 when the injured human is not being transported.

The first biasing member 46 and the second biasing member 56 are each preferably comprised of an elastic cord or other biasing material that creates a contracting force when the straps 40, 50 are extended during transporting of the injured human. The first biasing member 46 and the second biasing member 56 each are each preferably comprised of approximately the same length and are both shorter than the first strap 40 and the second strap 50 as illustrated in FIGS. 1 and 2 of the drawings.

F. Operation of Preferred Embodiment

Figure 4A:
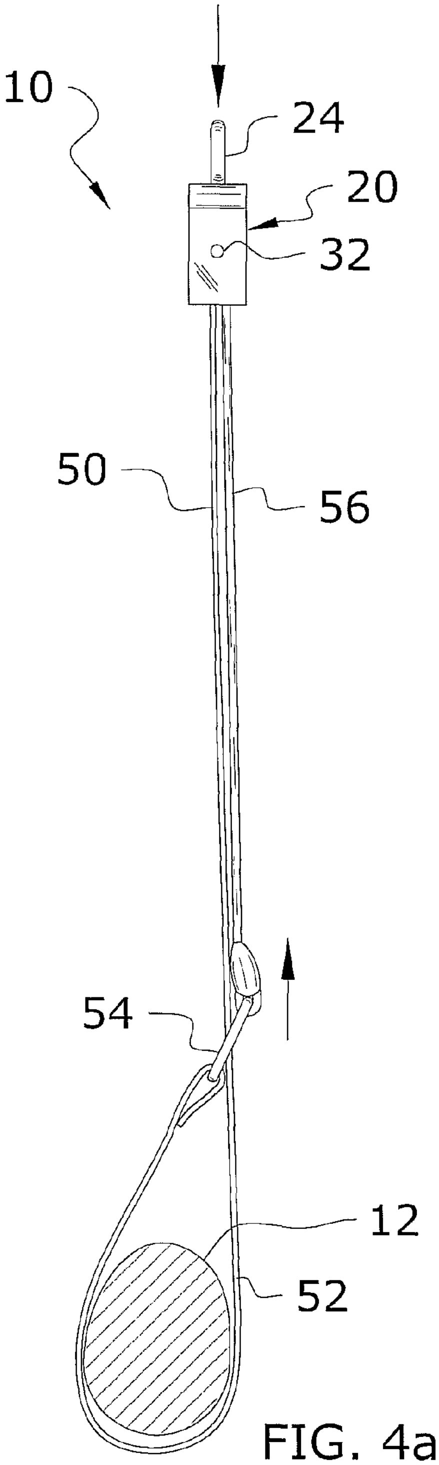
FIG. 4*a* is a side view of the present invention loosely surrounding a wrist of an injured human.
Figure 4B:
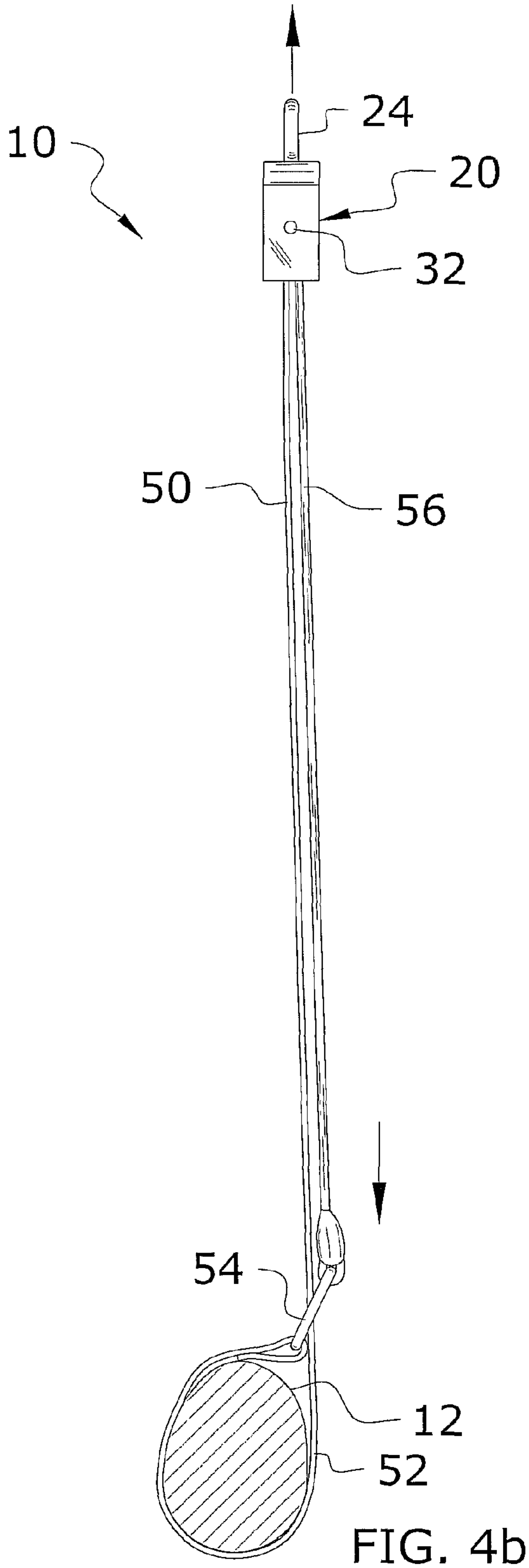
FIG. 4*b* is a side view of the present invention loosely surrounding a wrist of an injured human.
Figure 5:
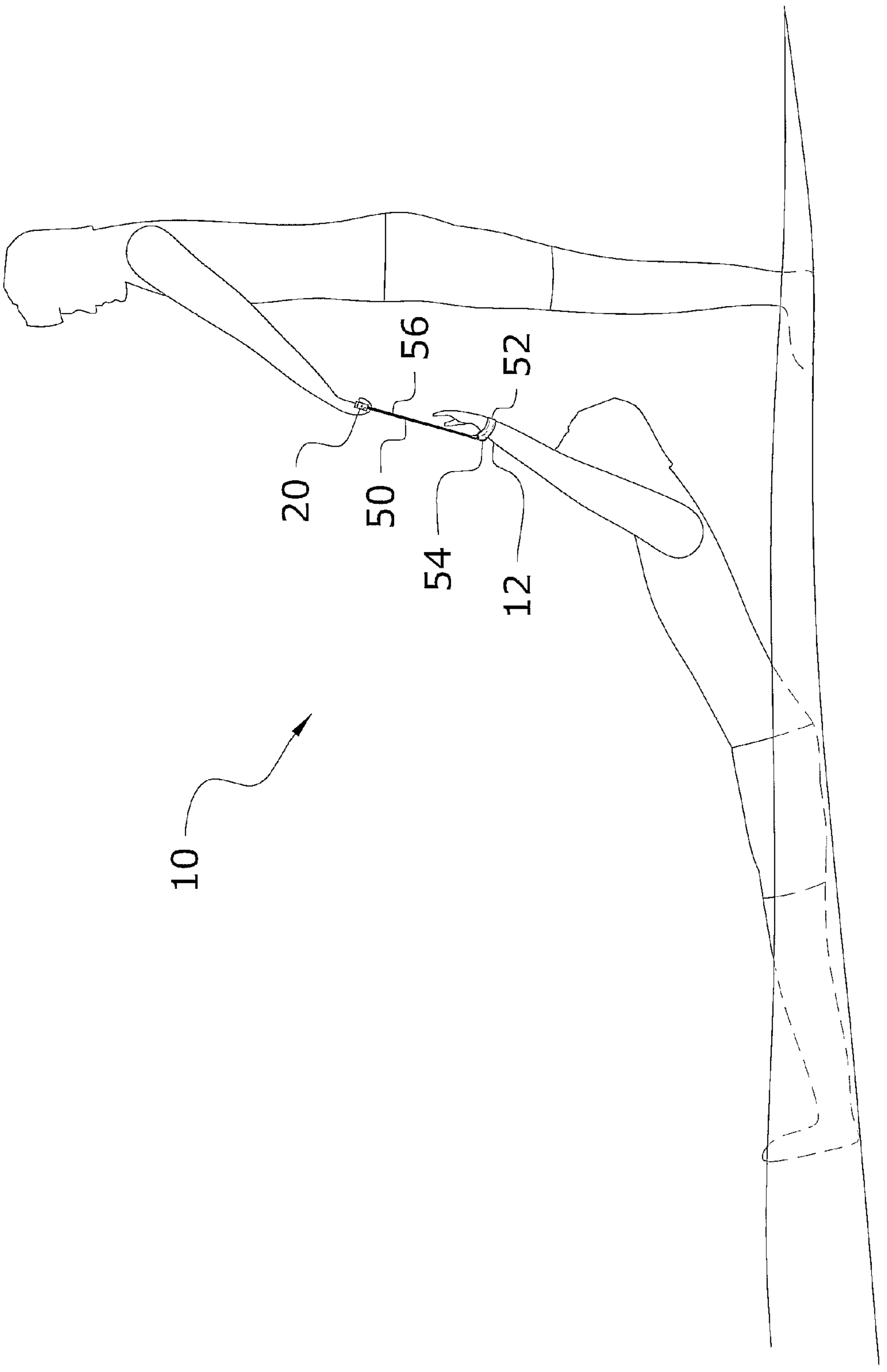
FIG. 5 is a side view of the present invention being utilized to remove an injured human from water.
Figure 6:
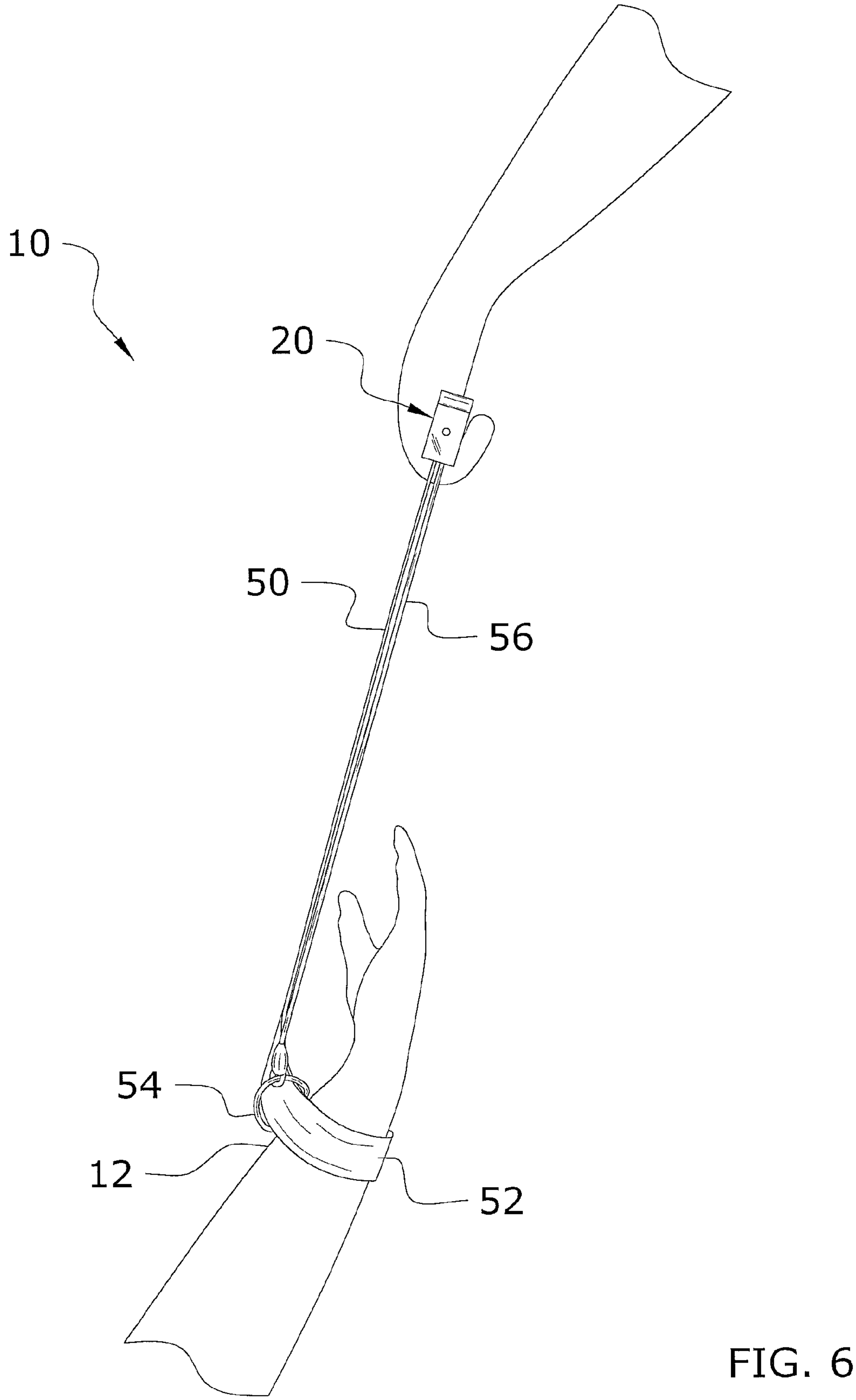
FIG. 6 is a magnified view of the present invention being utilized to remove the injured human.

In use, the user first positions the looped portions 42, 52 over the wrists 12 of the injured human as illustrated in FIG. 4*a* of the drawings. The biasing members 46, 56 ensure that the looped portions 42, 52 remain substantially open during this time thereby expediting the connection of the looped portions 42, 52 over the wrists 12. After the looped portions 42, 52 are properly positioned about the wrists 12 of the injured human, the user then pulls upwardly upon the handle 20 thereby causing the straps 40, 50 to tighten and make the looped portions 42, 52 smaller which then tighten upon the wrists 12 of the injured human as shown in FIGS. 4*b*, 5 and 6 of the drawings. During the upward movement of the handle 20, the biasing members 46, 56 are correspondingly stretched as best illustrated in FIG. 4*b* of the drawings. The stretching of the biasing members 46, 56 creates a contracting tension that assists in the opening of the looped portions 42, 52 when the user lowers the handle 20 to release the looped portions 42, 52 from the wrists 12 of the injured human. The user transports the injured human out of the water to a desired location as shown in FIGS. 5 and 6 of the drawings. Once the injured human is properly and safely positioned, the user lowers the handle 20 whereby the biasing members contract pulling the sliding loops 44, 54 toward the handle 20 thereby resulting in the opening of the looped portions 42, 52. With the looped portions 42, 52 opened, the user is able to easily and quickly remove the straps 40, 50 from the injured human and begin any necessary life saving procedures without interference.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A human transporting system, comprising:
a handle;
a first strap attached to said handle;
a first sliding loop attached to said first strap, wherein said first sliding loop slidably receives a portion of said first strap forming a first looped portion opposite of said handle for receiving a first wrist of an injured human;
a first biasing member attached between said handle and said first sliding loop, wherein said first biasing member applies a force upon said first sliding loop drawing said first sliding loop toward said handle thereby loosening said first looped portion;
a second strap attached to said handle;
a second sliding loop attached to said second strap, wherein said second sliding loop slidably receives a portion of said second strap forming a second looped portion opposite of said handle for receiving a second wrist of an injured human; and
a second biasing member attached between said handle and said second sliding loop, wherein said second biasing member applies a force upon said second sliding loop drawing said second sliding loop toward said handle thereby loosening said second looped portion.

2. The human transporting system of claim 1, wherein said handle is comprised of an elongated structure.

3. The human transporting system of claim 2, wherein said handle includes an outer surface and an inner surface opposite of said outer surface, wherein said inner surface faces said first strap and wherein said inner surface is comprised of a curved structure.

4. The human transporting system of claim 1, wherein said first biasing member and said second biasing member are each comprised of an elastic cord.

5. The human transporting system of claim 1, wherein said first biasing member and said second biasing member each are comprised of approximately the same length and are both shorter than said first strap and said second strap.

6. The human transporting system of claim 1, wherein said handle is comprised of a first end and a second end, wherein said first strap is attached adjacent to said first end and wherein said second strap is attached adjacent to said second end.

7. The human transporting system of claim 1, wherein said first strap and said second strap are comprised of a broad flat strap material.

8. The human transporting system of claim 1, wherein said first strap and said second strap are approximately the same length.

9. The human transporting system of claim 1, including at least one cutout within said handle and including at least one support member attached within said at least one cutout, wherein said straps and said biasing members are attached to said at least one support member.

10. The human transporting system of claim 1, wherein said first sliding loop and said second sliding loop are comprised of a circular ring.

11. A human transporting system, comprising:
a handle;
a first strap attached to said handle;
a first sliding loop attached to said first strap, wherein said first sliding loop slidably receives a portion of said first strap forming a first looped portion opposite of said handle for receiving a first wrist of an injured human;
a first wrist within said first looped portion;
a first biasing member attached between said handle and said first sliding loop, wherein said first biasing member applies a force upon said first sliding loop drawing said first sliding loop toward said handle thereby loosening said first looped portion;
a second strap attached to said handle;
a second sliding loop attached to said second strap, wherein said second sliding loop slidably receives a portion of said second strap forming a second looped portion opposite of said handle for receiving a second wrist of an injured human;
a first wrist within said first looped portion; and
a second biasing member attached between said handle and said second sliding loop, wherein said second biasing member applies a force upon said second sliding loop drawing said second sliding loop toward said handle thereby loosening said second looped portion.

12. The human transporting system of claim 11, wherein said handle is comprised of an elongated structure.

13. The human transporting system of claim 12, wherein said handle includes an outer surface and an inner surface opposite of said outer surface, wherein said inner surface faces said first strap and wherein said inner surface is comprised of a curved structure.

14. The human transporting system of claim 11, wherein said first biasing member and said second biasing member are each comprised of an elastic cord.

15. The human transporting system of claim 11, wherein said first biasing member and said second biasing member each are comprised of approximately the same length and are both shorter than said first strap and said second strap.

16. The human transporting system of claim 11, wherein said handle is comprised of a first end and a second end, wherein said first strap is attached adjacent to said first end and wherein said second strap is attached adjacent to said second end.

17. The human transporting system of claim 11, wherein said first strap and said second strap are comprised of a broad flat strap material.

18. The human transporting system of claim 11, wherein said first strap and said second strap are approximately the same length.

19. The human transporting system of claim 11, including at least one cutout within said handle and including at least one support member attached within said at least one cutout, wherein said straps and said biasing members are attached to said at least one support member.

20. A human transporting system, comprising:
a handle, wherein said handle is comprised of an elongated structure having a first end and a second end;
a first strap attached to said handle;
a first sliding loop attached to said first strap, wherein said first sliding loop slidably receives a portion of said first strap forming a first looped portion opposite of said handle for receiving a first wrist of an injured human;
a first wrist within said first looped portion;
a first biasing member attached between said handle and said first sliding loop, wherein said first biasing member applies a force upon said first sliding loop drawing said first sliding loop toward said handle thereby loosening said first looped portion;
a second strap attached to said handle;
wherein said first strap and said second strap are comprised of a broad flat strap material;

wherein said first strap and said second strap are approximately the same length;

a second sliding loop attached to said second strap, wherein said second sliding loop slidably receives a portion of said second strap forming a second looped portion opposite of said handle for receiving a second wrist of an injured human;

wherein said first sliding loop and said second sliding loop are comprised of a circular ring;

a second wrist within said second looped portion;

a second biasing member attached between said handle and said second sliding loop, wherein said second biasing member applies a force upon said second sliding loop drawing said second sliding loop toward said handle thereby loosening said second looped portion;

wherein said first biasing member and said second biasing member are each comprised of an elastic cord;

wherein said first biasing member and said second biasing member each are comprised of approximately the same length and are both shorter than said first strap and said second strap;

wherein said handle includes an outer surface and an inner surface opposite of said outer surface, wherein said inner surface faces said first strap and wherein said inner surface is comprised of a curved structure;

wherein said first strap is attached adjacent to said first end and wherein said second strap is attached adjacent to said second end; and at least one cutout within said handle and including at least one support member attached within said at least one cutout, wherein said straps and said biasing members are attached to said at least one support member.

* * * * *